United States Patent [19]

Ritter et al.

[11] Patent Number: 5,770,639

[45] Date of Patent: Jun. 23, 1998

[54] USE OF SELECTED, BIOLOGICALLY SAFE STABILIZERS IN POLYVINYL-ESTER-BASED IMPREGNATING COMPOSITIONS FOR SOIL STABILIZATION

[75] Inventors: Wolfgang Ritter, Haan; Stephan von Tapavicza, Erkrath; Christiane Hoeltgen, Duesseldorf, all of Germany

[73] Assignee: Henkel Kommanditgesellschaft auf Aktien, Duesseldorf, Germany

[21] Appl. No.: 776,867

[22] PCT Filed: Aug. 1, 1995

[86] PCT No.: PCT/EP95/03066

§ 371 Date: Mar. 26, 1997

§ 102(e) Date: Mar. 26, 1997

[87] PCT Pub. No.: WO96/05268

PCT Pub. Date: Feb. 22, 1996

[30] Foreign Application Priority Data

Aug. 10, 1994 [DE] Germany ............................ 44 28 269.9

[51] Int. Cl.$^6$ .......................... C09K 17/20; C08K 5/101; C08K 5/103

[52] U.S. Cl. .......................... 523/132; 523/131; 524/284; 524/300; 524/315; 524/318; 524/321; 524/322; 524/378; 524/394; 524/385

[58] Field of Search .................................. 523/131, 132, 523/500, 501, 523, 526, 313, 380, 322, 315, 284, 300, 394, 399, 400

[56] References Cited

U.S. PATENT DOCUMENTS

| | | | |
|---|---|---|---|
| 3,887,506 | 6/1975 | Hewitt | 523/132 |
| 4,072,020 | 2/1978 | Bishop | 106/287.24 |
| 4,107,112 | 8/1978 | Loitta, Jr. et al. | 523/132 |

FOREIGN PATENT DOCUMENTS

| | | |
|---|---|---|
| 43 24 474 | 1/1995 | Germany . |
| 11 654 | 6/1976 | Hungary . |
| 52 040 540 | 3/1977 | Japan . |
| 56 161 462 | 12/1981 | Japan . |
| 7501787 | 3/1976 | South Africa . |
| 906 470 | 9/1962 | United Kingdom . |

OTHER PUBLICATIONS

Arch. AckerPflanzenbau bodenkd., 22(11), 713–19.

(Univ. Ghent, Belgium) in Soil Sci, 118(5), 332–8.

"Der quantitative mikrobiolgische Abbau von Lackkunstharzen und Polymerdispersionen (The Quantitative Microbiological degradation of Paint–Grad Resins and Polymer Dispersions)", Farbe + Lack, vol. 98, Jul. 1992, 505–8.

*Primary Examiner*—Peter A. Szekely
*Attorney, Agent, or Firm*—Ernest G. Szoke; Wayne C. Jaeschke; Real J. Grandmaison

[57] ABSTRACT

The invention relates to the use of fatty acids or fatty alcohols—which are solid at room temperature and/or which cure in the presence of air—and/or at least substantially water-insoluble esters, ethers and/or salts thereof with, in particular, polyvalent cations as degradable and biologically safe stabilizers for increasing the water resistance of soil impregnations based on polyvinyl esters, more particularly PVAc.

16 Claims, No Drawings

USE OF SELECTED, BIOLOGICALLY SAFE STABILIZERS IN POLYVINYL-ESTER-BASED IMPREGNATING COMPOSITIONS FOR SOIL STABILIZATION

BACKGROUND OF THE INVENTION

1. Field of the Invention

This invention relates to an improvement in and extension of the teaching described in earlier German patent application P 43 24 474.2 for the surface stabilization of sand and/or soil, hereinafter generally referred to as soil. This earlier application describes a modification to the process known per se of achieving at least temporary stabilization by application and introduction of aqueous polymer dispersions to and into surface layers of soil. The water in the impregnating composition introduced dries in a comparatively short time and the polymer phase remaining behind solidifies the structure, for example the granular structure, of the impregnated soil without unduly affecting the permeability of these layers to water. Surface stabilization such as this is not confined to soil in the narrower sense. The corresponding stabilization of other surface zones which have to be protected, for example, against wind erosion falls within the scope of the teaching according to the invention. Examples of such surface zones include dumps and/or spoil banks with or without application of a covering of top soil or other protective layers.

2. Discussion of Related Art

Development and practice have been concerned for decades with the concept—on which the present invention is also based—of applying synthetic polymers which cause particulate solids to adhere to one another to the surfaces to be stabilized in the form of aqueous dispersions or emulsions and leaving them to dry thereon. Aqueous polyvinyl acetate dispersions, hereinafter also referred to as PVAc dispersions, are of particular significance in this regard, cf. A. Kullmann et al. in Arch. Acker-Pflanzenbau Bodenkd., 22(11), 713–19. Besides polyvinyl acetate, butadiene/styrene latex, a urea/formaldehyde polymer and a bitumen emulsion are described as useful binders. The corresponding stabilization of dune sand against the effects of rain is the subject of an article by D. Gabriels et al. (Univ. Ghent, Belgium) in Soil Sci, 118(5), 332–8. In this publication, too, a binder system based on polyvinyl acetate is included among the preferred binders. U.S. Pat. Nos. 4,072,020, 3,887,506, HU 11 654 and ZA 7501787 are mentioned as examples of the other works being carried out worldwide.

The list of requirements or functions to be fulfilled by corresponding stabilization of the earth's surface can be extremely diverse. Without any claim to completeness, some of the properties required in practice are mentioned in the following: the material should be resistant at least to pedestrian traffic, it should not be affected by the particular temperatures prevailing, atmospheric humidity or rain (for the period envisaged) and should also be resistant to high wind speeds. The material to be applied should be non-inflammable and should not represent a fire or explosion risk either in storage or during and after its application. Its transport and application should not entail any exceptional protective measures or the wearing of protective clothing. The cured polymer impregnation should not have any toxic effect on germinating plants, on growing plants or on animals and should be colorless or transparent. Taking these and other requirements into account, the present state of the art may be summarized as follows:

1. PVAc homopolymer dispersions are basically suitable as binders. In the absence of plasticizers, however, the cohesion of the soil layers impregnated with PVAc homopolymer dispersions is so brittle that key application requirements are not satisfied.
2. The deficiency mentioned in (1) can be eliminated by using plasticizers capable of flow under normal conditions. In practice, dibutyl phthalate has proved to be a particularly effective plasticizer. Correspondingly plasticized PVAc homopolymers provide for firm cohesion although the plasticizer is non-degradable.
3. Internally plasticized polymer dispersions (polyvinyl acetate co-dibutyl maleate) provide for firm cohesion but are also non-degradable.

The teaching of earlier German patent application P 43 24 474.2 cited at the beginning addresses the problem of providing PVAc homopolymer dispersions for the described application with plasticizers which, on the one hand, meet the diverse requirement profile, but which on the other hand are biologically safe and, in particular, degradable. The teaching in question is based on the knowledge that, basically, PVAc homopolymers are biologically safe and degradable even though degradation of this polymer is comparatively slow. The relevant literature is represented, for example, by H. Kastien et al. "Der quantitative mikrobiologische Abbau von Lackkunstharzen und Polymerdispersionen (The Quantitative Microbiological Degradation of Paint-Grade Resins and Polymer Dispersions)" , Farbe+Lack, Vol. 98, 7/1992, 505–8. According to the teaching of the earlier application, the following selected classes of compounds are used as biologically acceptable plasticizers for PVAc dispersions: triesters of glycerol with lower aliphatic monocarboxylic acids, citric acid triesters with lower aliphatic monohydric alcohols and/or epoxidized triglycerides of at least partly olefinically unsaturated fatty acids.

Particulars of the technical teaching according to earlier patent application P 43 24 474 can be found in its disclosure which is hereby included as part of the disclosure of the present invention.

Using the impregnating or solidifying compositions described in the earlier patent application cited above, it is possible optimally to stabilize the surface of the treated soil, for example in layer thicknesses of up to a few centimeters, so that the requirement profile mentioned above is satisfied under normal conditions. Unfortunately, further investigations have shown that the surfaces thus stabilized can be softened to a considerable extent by moist substrates/soils or by intensive contact with moisture, for example by heavy rain. Although the stabilizing effect generally returns after drying, i.e. does not disappear completely, this is nevertheless a weakness in terms of practical application. The elimination of this weakness is the subject of the teaching of the present invention. Accordingly, coating or impregnating compositions for soil or sand are described in the following which have a distinct stabilizing effect both on dry and on wet substrates and which retain their stabilizing effect both in dry conditions and in damp or wet conditions. The biological degradability and soil compatibility of the coating remain intact whatever the conditions.

DESCRIPTION OF THE INVENTION

Accordingly, the present invention relates to the use of fatty acids or fatty alcohols—which are solid at room temperature and/or which cure in the presence of air—and/or at least substantially water-insoluble esters, ethers and/or salts thereof as degradable and biologically compatible stabilizers for increasing the water resistance of soil impregnations based on polyvinyl acetate and comparable esters of polyvinyl alcohol with lower monocarboxylic acids.

DETAILED DESCRIPTION OF THE INVENTION

Accordingly, the present invention proposes the following modification to the described compositions: biologically safe and naturally degradable auxiliaries which, by virtue of their at least predominantly oleophilic molecular structure, are capable of distinctly increasing the resistance to water of the impregnating composition, even under extreme conditions, are introduced as an additional component into the soil layers to be stabilized. Nevertheless, the auxiliaries of the teaching according to the invention are accessible to natural degradation processes. In addition to the predominant oleophilic component, their molecular structure is distinguished by the presence of functional groups (hydroxyl groups, carboxyl groups, ether and/or ester groups) which are known as starting points for the simplified microbiological degradation of such compounds or rather classes of compounds. The degradation rates of the auxiliaries used in accordance with the invention are generally such that the desired protective effect of the impregnating composition against excessive penetration of water can be guaranteed for the periods required in practice. The principle of temporary soil stabilization described in detail in the earlier application cited above does of course provide for the simultaneous seeding of the soil layers to be stabilized with suitable plants and, hence, for increasing stabilization by natural plant growth as the temporary stabilization provided by resin-based compositions in accordance with the present invention disappears under the effect of degradation processes, more particularly bacterial degradation processes, in the soil.

The chemical structure of suitable and particularly preferred subclasses of the stabilizers according to the invention is discussed first in the following. The preferred principles under which the stabilizers are introduced and used in the impregnating composition and the layers of soil to be stabilized are described thereafter.

Fatty acids and fatty alcohols are known among experts to be corresponding compounds or mixtures of compounds which are distinguished by a sufficiently long hydrocarbon chain in the molecule. This is responsible for their predominantly oleophilic character despite the presence of the hydrophilic functional groups. Accord- ingly, fatty acids and fatty alcohols corresponding to the definition according to the invention are distinguished by hydrocarbon chains with at least 6 and preferably at least 8 to 10 carbon atoms in the molecule. The upper limit to the number of carbon atoms in the molecule is generally at around 30 carbon atoms although this figure is by no means binding. Fatty acids of natural and/or synthetic origin—and the corresponding fatty alcohols—are generally mixtures which, on average, contain 10 to 24 carbon atoms and, more particularly, around 12 to 22 carbon atoms in the molecule. Reference is made in this regard to the literature available to experts.

Another two elements of the molecular structure of the classes of compounds in question are used for their characterization: oleo-organic compounds of the type in question may be aliphatically saturated or even monoolefinically and/or polyolefinically unsaturated. More particularly, numerous representatives of natural origin are distinguished by the presence of more or less large quantities of such monoolefinically and/or polyolefinically unsaturated carboxylic acids with carbon chain lengths in the range mentioned, although if desired the synthesis processes typically in use today provide unsaturated representatives of the classes of compounds in question in addition to saturated types.

The second important characteristic is the chain structure of the particular molecule. Natural fatty acids and fatty alcohols derived from them are characterized at least by far predominantly by their linear molecular structure. Corresponding representatives with a more or less heavily pronounced branching of the chain are known in synthetic chemistry in particular. Finally, the dependence of both rheology and biological degradation behavior of these structural parameters of the fatty components are well known. With regard to rheology, both olefinic double bonds in the molecule and the branching of the chain lead to a reduction in the melting points. Biological degradability is best guaranteed among the linear representatives of the fatty components in question, corresponding representatives with an even number of carbon atoms, as present in the components based on natural materials, being particularly readily degradable. However, even limited chain branchings with, in particular, occasional methyl substituents can still be effectively degraded by biological degradation processes.

The desired degradation processes actually occurring within the context of the teaching according to the invention are, in particular, corresponding aerobic mechanisms. It is known among experts that, under these conditions, not only fatty acids, fatty alcohols and corresponding components with ester groups undergo bacteriological degradation, corresponding ethers are also degraded under aerobic conditions—albeit generally with some delay.

These facts known per se among experts are intentionally discussed in the description of the invention. So far as the teaching according to the invention is concerned, the possibility of influencing the time required for the bacteriological degradation of the stabilizers used in accordance with the invention by selecting certain molecular structures of those stabilizers derives from these facts taking general specialist knowledge into consideration. Accordingly, it is thus indirectly possible to regulate the time in which the moisture-repelling hydrophobic properties of the stabilizer are pronounced sufficiently strongly to guarantee the required protective effect of the impregnating composition in the soil.

Basically, any representatives of the class of stabilizers under discussion based on fatty alcohols, fatty acids, esters and/or ethers thereof and fatty acid salts are suitable for use in accordance with the invention. The particular choice of specific representatives and the form in which they are applied are determined by the particular conditions prevailing and by individual requirements. Expert knowledge will enable individually selected representatives of the classes of stabilizers under discussion to be used in accordance with the invention in the broadest sense.

Basically, it is preferred to use these stabilizers also in the form of aqueous preparations and to introduce them into the soil in this form. Since the stabilizers as such are substantially insoluble in water, their use in the form of aqueous emulsions and/or dispersions is again the optimal technical solution. As discussed in more detail hereinafter, the stabilizers may be used both in admixture with the impregnating compositions based on polyvinyl acetate and/or separately therefrom. The structure-dependent rheology of the classes of oleochemical compounds in question, the conditions for practical application and the requirements which the stabilizers used in accordance with the invention are expected to satisfy in regard to soil impregnation enable individual representatives of the compounds used in accordance with the invention to be assigned to a number of subsidiary groups. Without any claim to completeness, the following observations may be made in this regard:

The stabilizers applied in the form of an aqueous emulsion or dispersion are generally required to have a minimum film forming temperature of around 0° to 15° C. and, more particularly, around 5° to 10° C. On removal of the aqueous phase either by sinking into the substrate or by evaporation, sufficiently continuous layers of the stabilizers are formed within the impregnation and/or on the surface thereof under normal working conditions so that the desired protective effect against the excessive penetration of moisture can be achieved.

Suitable stabilizers may be present as solids or as liquid phases in the vicinity of this film forming temperature. Where the stabilizers used are solid at the film forming temperature, it can be of advantage to use flow aids, more especially organic flow aids, which are preferably miscible with the stabilizers and, at the same time, biologically safe and degradable. Suitable flow aids of this type are, for example, components based on alcohols, ethers and/or carboxylic acid esters which are flowable and preferably show low volatility at tempera- tures of 5° to 15° C.

In one important embodiment, however, at least partly monoolefinically and/or polyolefinically unsaturated fatty acids, fatty alcohols and/or derivatives thereof with an ester and/or ether structure are used as stabilizers. Even in the case of linear fatty components of the type in question, the presence and number of the olefinic double bonds generally guarantees adequate flowability at the application temperature of the soil to be treated so that the formation of continuous hydrophobic layers and hence the development of the required water-repellent effect are ensured. olefinically unsaturated stabilizers of the type in question afford an additional advantage, namely: as known per se, corresponding flowable fatty compounds dry under the effect of atmospheric oxygen so that the originally liquid films are converted into solid films. Nevertheless, the biodegradability requirement remains intact, cf. the above cited literature reference of Heinz Kastien et al. in "Farbe und Lack" 1992.

A particular feature for the formation of at least substantially continuous oleochemical films lies in the following embodiment: both unsaturated and monoolefinically and/or polyolefinically unsaturated fatty acids can be converted by cations, more particularly polyvalent cations, into the corresponding salts which are generally distinguished by modified rheological properties. Suitable and preferred polyvalent salt-forming cations are, in particular, corresponding representatives of the second and/or third main group of the periodic system, more particularly calcium and/or aluminium. Salt formation may take place before or even after application of the stabilizers to the soil. Subsequent oxidative reaction and hence further stabilization can also take place in the case of corresponding salts with olefinically unsaturated components in the carboxylic acid groups.

Stabilizers of ester structure are of particular significance in the context of the teaching according to the invention, the defined fatty acid residues in a first class of compounds determining the ester structure. The esters in question are, for example, full and/or partial esters of, in particular, at least partly olefinically unsaturated fatty acids with polyhydric alcohols. Preferred esters are derived from lower polyhydric alcohols containing in particular 2 to 6 hydroxyl groups and preferably up to 6 carbon atoms. Corresponding glycerides or partial glycerides of the fatty acids and/or their oligomers can be particularly interesting representatives for the purposes of the teaching according to the invention.

Oils and/or fats based on natural materials are mentioned purely by way of example in this connection. Corresponding oils and/or fats are known to accumulate as triglycerides of fatty acids or fatty acid mixtures with at least partly olefinically unsaturated fatty acid components in the triglyceride. Depending on the structure and concentration of the unsaturated fatty acid residues, oils and/or fats of the type in question are suitable for oxidative curing through three-dimensional crosslinking. Wide scale use is made of this in practice, cf. for example the field of paint raw materials where, for example, oxidatively curing oils of natural origin based on linseed oil have long been widely used. Corresponding stabilizers of natural origin can be important components for the application according to the invention. They may be used with or without curing components which generally accelerate the formation of a three dimensionally crosslinked paint film. Relevant expert knowledge may be applied in this connection.

Another preferred class of ester-based stabilizers may be defined as oligo- or polyesters of fatty acids and/or fatty alcohols and polyfunctional reactants from the classes of oligo- or polycarboxylic acids and/or oligo- or polyalcohols. Examples of such stabilizers are the known polyesters of the alkyd resin type and also polyvinyl alcohol oligomers and polymers esterified with fatty acid residues and (meth) acrylate oligomers and/or polymers esterified with optionally olefinically unsaturated fatty alcohol residues. An important criterion determining the choice of these stabilizers can again be the question of sufficiently complete degradability by natural degradation processes in the soil not only of individual components of the ester or polyester structure. More particularly, the choice of stabilizer for the application according to the invention may be co-determined by the degradability of the primary components of the starting molecule, for example in the course of an ester hydrolysis.

In the context of the alkyd resins discussed in the foregoing as a suitable class of stabilizers, it can be of advantage to use selected compounds of this type which are at least largely based on natural materials. It is known that alkyd resins include polyesters of polycarboxylic acids, polyols and monofunctional alcohols and/or carboxylic acids. Oxidatively reactive alkyd resins are known commercial products; to this extent, reference may be made to general expert knowledge. They may be used, for example, as raw materials for air-drying paints. Known commercial products are also made up in particular in the form of aqueous dispersions which contain the self-drying alkyd resins in the form of a finely dispersed resin in a continuous aqueous liquid phase. Air-reactive aqueous alkyd resin dispersions of this type are particularly suitable starting materials for the purposes of the invention.

The oxidative reactivity of such alkyd resin derivatives is generally attributable to a content of olefinically unsaturated substituents in the alkyd resin polyester molecule. Corresponding olefinically unsaturated reactive elements may be introduced into the alkyd resin molecule in known manner by incorporation of unsaturated alcohols and/or unsaturated carboxylic acids. Representatives of the alkyd resins discussed in the foregoing which are at least largely based on natural materials can be of particular interest in this regard and in connection with the teaching according to the invention. Thus, monocarboxylic acids and/or monohydric alcohols of natural origin may be used to derivatize the alkyd resins. Where dicarboxylic acids and at least trihydric alcohols are used in combination with monobasic carboxylic acids and, optionally, other diols, it is possible for example to obtain corresponding monocarboxylic-acid-derivatized alkyd resins which can be made to react or crosslink by oxidation through the use of at least partly mono- and/or polyolefinically unsaturated monocarboxylic acids. An oxidatively reactive alkyd resin modified with olefinically unsaturated alcohols can also be prepared in known manner by reversing the functionalities.

Alkyd resins based on natural materials of the particularly preferred type according to the invention are based on glycerol as the trifunctional polyol component and fatty acids of natural origin as the monofunctional carboxylic acid component. The monofunctional reactants are used on average in such quantities as to allow the required reaction with dicarboxylic acids which, in one preferred embodiment, are in turn degradable in natural degradation processes. Corresponding modified alkyd resins based at least largely on natural materials are then distinguished, for example, by the fact that more than 50% by weight and preferably from 60 to 70% by weight of the alkyd resin consists of components based on natural materials, more particularly glycerol and monofunctional fatty acids, and for the rest of dicarboxylic acids and, optionally, additional diol components in the polymer molecule.

The stabilizers according to the invention may be introduced into the soil by, in particular, two methods, which, if desired, may even be combined with one another. In a first embodiment, the impregnating composition based on the polyvinyl ester preparations is introduced in a first step while the stabilizer preparation is separately applied or introduced thereafter. However, the two treatment preparations may also be introduced together into the soil. To this end, the generally aqueous preparations of the impregnating composition and the stabilizers may initially be mixed together and then applied to the soil. These two introduction mechanisms may be combined with one another. The theoretically possible other variant where the stabilizer is initially introduced and the impregnating composition subsequently introduced generally gives unsatisfactory results.

The quantity of stabilizers to be used in each individual case is influenced by a number of factors. Minimum quantities of at least about 50 g/m$^2$ of surface area to be treated and preferably quantities of at least about 100 g/m$^2$ are generally desirable and suitable for establishing durable increases in the strength of the polyvinyl-acetate-based impregnating composition. The lower limits mentioned apply to the water-free stabilizers or stabilizer mixtures free from optional flow aids. Quantities of stabilizer of up to 400 g/m$^2$ of surface area to be treated may be desirable in special cases although satisfactory results are generally achieved with quantities of stabilizer of around 150 to 250 g/m$^2$.

The quantity ratios of stabilizer on the one hand and impregnating composition on the other hand (based once again on the water-free mixtures of pure useful materials) may vary within relatively wide limits. For example, quantity ratios of the impregnating composition, more particularly based on PVAc, to the stabilizers (water-free useful materials) of about 5:1 to 1:5 are suitable, corresponding ratios of 1:3 to 2:1 being preferred. Substantially equal quantities of impregnating composition and stabilizer have proved to be useful in many applications.

The depth of penetration of the impregnation into the soil can be influenced to a certain extent by sufficiently diluting the components in the aqueous preparations applied. The respective aqueous preparations may be applied by hand, for example with a watering can, although—on an industrial scale—they are preferably applied by spray nozzles. Unless the two components in question are applied together or simultaneously in a single operation, it can be useful to allow a certain time, usually a few hours or even longer, to elapse between the first application of the impregnating composition and the second application of the aqueous stabilizer preparations defined in accordance with the invention.

Particulars of the characteristics of the impregnating composition based on selected polyvinyl ester dispersions can be found in applicants' earlier German patent application P 43 24 474.2. The following additional observations are made over and above the disclosure of that patent application:

Polyvinyl acetate is particularly suitable as the polymeric binder of the impregnating composition. However, the teaching according to the invention is not confined to polyvinyl acetate. Other polymers of vinyl alcohol with lower monocarboxylic acids, more particularly with up to 4 or 5 carbon atoms in the carboxylic acid residue, may also be used. Besides polyvinyl acetate, polyvinyl propionate and aqueous preparations thereof are particularly important. Both homopolymers and copolymers of the polyvinyl esters mentioned may be used in practice.

In another modification of the teaching according to the invention, an important constituent of the impregna- ting composition may be derived from the group of vinyl ester copolymers. Copolymers of lower vinyl esters of the vinyl acetate and/or propionate type with vinyl esters of higher monobasic carboxylic acids are particularly suitable vinyl ester copolymers. Preferred representatives of this group of copolymers are the vinyl esters of, in particular, saturated monocarboxylic acids containing at least 8 and preferably at least 10 carbon atoms, particular significance being attributed to monocarboxylic acids containing 10 to 16 carbon atoms. An important representative of such copolymers for many reasons is, for example, a polyvinyl acetate co-laurate.

To complete the disclosure of the present invention, basic principles of the impregnating composition based on polyvinyl acetate are described in the following with reference to the earlier application cited above. The corresponding observations may also be applied to the above-described extended possibility of forming the polymer compounds in the impregnating composition.

Plasticizers are generally added to the aqueous polyvinyl acetate dispersions to improve the mechanical load-bearing capacity of the impregnated soil. The preferred biodegradable plasticizers are triesters of glycerol with lower aliphatic monocarboxylic acids, citric acid triesters with lower aliphatic monohydric alcohols and/or epoxidized triglycerides of at least partly olefinically unsaturated fatty acids. These plasticizers are added to the aqueous polyvinyl acetate dispersions in small quantities, normally in quantities of around 1 to 15% by weight and preferably in quantities of around 3 to 10% by weight, based on an approximately 50% by weight aqueous polyvinyl acetate dispersion. Preferred glycerol triesters of aliphatic monocarboxylic acids contain monocarboxylic acid residues with 2 to 6 and preferably 2 to 4 carbon atoms in the molecule. Triacetin is particularly important as a plasticizer. Suitable citric acid triesters contain residues of aliphatic monohydric alcohols containing 2 to 6 carbon atoms and, more particularly, 2 to 4 carbon atoms. Suitable representatives from this group are citric acid triesters which contain the citric acid residue as such and also corresponding derivatives of citric acid in the form of the variant acylated at the hydroxyl group.

It is characteristic of the plasticizers in the impregnating composition that even comparatively small quantities guarantee sufficient flexibilization of the solidified layer.

A special aspect regarding the need to add a plasticizer can apply in cases where the vinyl ester copoly- mers mentioned above containing lower vinyl esters of the vinyl acetate and/or propionate type together with vinyl esters of higher monofunctional carboxylic acids, more particularly a fatty acid, in the molecule are used. Further studies conducted by applicants have shown that impregnating compositions based on these vinyl ester copolymers meet the two requirements of sufficiently plasticized impregnation and biological degradability, even without the addition of plasticizers. Accordingly, there is no need in their case to use plasticizers of the type known from the prior art and described in applicants' earlier German patent application P 43 24 474.2 cited at the beginning.

The preferred measure that other additives of the selected aqueous impregnating and stabilizing compositions should be biologically degradable and hence biologically safe also applies to the teaching according to the invention. According to the invention, biodegradable protective colloids in particular are used to stabilize the aqueous preparations. Suitable protective colloids are, for example, polyvinyl alcohol and also starch and/or water-soluble starch derivatives (the starch may even be subjected to a partial reduction in molecular weight). However, the incorporation of readily degradable natural materials of the starch type and/or the water-soluble starch derivative type does endanger the stability of the film to erosion by rain and, hence, involves the danger of over-rapid degradation of the film. The use of the stabilizers in accordance with the invention can provide important assistance in this regard. The quantities in which the protective colloids or emulsifiers are used are typically at most about 5% by weight and, more particularly, in the range from about 0.5 to 3% by weight, based on the water-free useful material of the aqueous emulsion or dispersion used.

The technical elements developed in the relevant prior art for the formation of corresponding surface films may also be utilized in the context of the teaching according to the invention. For example, reference is made in this regard to the use of growth-promoting active substances, more particularly fertilizing auxiliaries, and/or to the use of preferably fine-particle solids, more particularly in the aqueous preparation of the impregnating composition. In the last-mentioned case, it is known that the prior art provides in particular for the use of fine-particle solids based on natural materials, such as sawdust, straw particles, cereal husks, coconut and/or flax fibers and the like, in order in this way to ensure the formation of local openings for further promoting plant growth without endangering the overall cohesion of the solidified layer.

The use of small quantities of surface-active components, more particularly in the aqueous preparations of the impregnating composition and/or stabilizers, can be desirable. Particularly suitable surface-active components are those of the o/w type which, in the preferred embodiment, are also distinguished by biological compatibility and, more particularly, by biological degradability. Corresponding surfactants based on alkyl polyglycosides (APG) are particularly important in this regard. By using components such as these, it is possible on the one hand to facilitate stabilization, more particularly the stabilization of stabilizer components in aqueous preparations (for example the stabilization of linseed oil as an aqueous dispersion) and, on the other hand, to promote wetting of the soil to be stabilized. A measure such as this is of practical significance, for example, in the stabilization of overdried areas of sand. Relevant expert knowledge may be applied in regard to the type and quantity of particular surface-active agents used.

The soil-stabilizing aqueous preparations may be applied in known manner at the same time as plant seeds. However, the corresponding treatment of the soil may also be carried out independently of stabilization before or after application of—in particular—the aqueous impregnating composition defined in accordance with the invention.

Field trials with the auxiliaries described in accordance with the invention have shown that not only can the required stabilization of soil be achieved and maintained over a considerable period of at least several weeks without affecting the germination processes and resulting plant growth, another often desirable effect has also been observed: water retention in areas of soil treated in accordance with the invention is distinctly increased in relation to adjacent untreated areas of soil. It is clear that there are important advantages here, more especially for the stabilization and grassing of soil in arid regions and/or under comparatively hot climatic conditions.

The invention proposes another possible modification for enhancing this effect: the chemistry of natural materials, synthetic chemistry and/or semisynthetic chemistry have developed a plurality of polymer components which are distinguished by an extreme water absorption capacity and by a high retention capacity for the water absorbed. Corresponding materials are widely used as socalled "superslurpers" in various fields of application, more particularly in the field of hygiene. Now, suitable preparations of such water-binding polymers may also be used in accordance with the invention for treating surface layers of soil and hence for promoting plant growth and, at the same time, limit the quantity and/or frequency of artificial watering of the soil planted with seeds, for example grass seeds. These water-binding semisynthetic or fully synthetic polymers may be introduced into the soil before it is treated with the impregnating compositions described in accordance with the invention, although they may also be combined with at least part of the adhesive-like impregnating composition. Information on the chemical characteristics of these water-binding auxiliaries can be found in the relevant specialist literature on auxiliaries of the type in question. Growth-promoting auxiliaries may also be used in accordance with the teaching of the present invention.

EXAMPLES

Example 1

In a first series of tests, coarse builder's sand is stabilized as a working model. The builder's sand is placed in trays measuring 33×24 cm. The layer thickness of the sand is about 2 to 3 cm.

The binders used are based on an aqueous polyvinyl acetate dispersion (first test group) and on a corresponding aqueous dispersion of a vinyl acetate/vinyl laurate copolymer—ratio by weight of VAc to VL approx. 3:1 —(second test group) which have been diluted with water to a solids content of 10% by weight. Quantities of 2,000 g/m$^2$ of these dispersions are uniformly sprayed, sprinkled or brushed onto the surface of the sand. The dispersions of the first test group contain triacetin as plasticizer; the dispersions of the second test group are plasticizer-free.

After an intermediate drying time of around 24 hours, the stabilizer—also in the form of an aqueous preparation diluted to 10% by weight—is applied in a quantity of 2,000 g/m$^2$. Accordingly, the quantity of polymer applied both as PVAc or copolymer and as stabilizer amounts to 200 g/m$^2$.

In alternative tests, a 20% by weight aqueous dispersion containing 10% by weight of PVAc and 10% by weight of the stabilizer is used to treat the builder's sand in the trays. The quantity applied again amounts to 2,000 g/m$^2$.

A commercial alkyd resin dispersion ("Jägalyd WE 57", a product of E. JÄger, Düsseldorf) is used as stabilizer in accordance with the teaching of the invention.

The sand samples treated in accordance with the invention in the trays are dried and evaluated or subjected to a watering cycle and then measured for wet stability. In addition, the layer thickness of the solidified sand layers is determined.

The particulars of the treatment steps carried out and the aftertreatment or evaluation of the test samples can be found in Table 1 below. The following symbols were used for the strength evaluation of the treated sand layer:

F++=hard surface
F+=surface yields, but solidified
F−=surface partly solidified
F−−=surface slightly solidified

TABLE 1

| | Comparison Examples | | |
|---|---|---|---|
| Impregnating agent | PVAc | PVAc/VL | |
| Plasticizer | 5% Triacetin | | |
| Stabilizer (alkyd resin) | | | Jägalyd WE 57 |
| Concentration applied in % by weight | 10 | 10 | 10 |
| Layer thickness of sand | 2–3 cm | 2–3 cm | 2–3 cm |
| Strength after drying | F++ | F+ | F++ |
| Thickness of the solidified layer | 1.6 cm | | 0.74 cm |
| 1st Watering | | | |
| Appearance in the moist state | F+ | F+ | F− |
| Appearance after drying for 24 h | F++ | F++ | F− |
| Appearance after artificial watering for 1 week Evaluation in the moist state | F−− | F−− | F−− |

| | Examples according to the invention | | | | |
|---|---|---|---|---|---|
| Impregnating agent | PVAc | PVAc | PVAc | PVAc/VL | PVAc/VL |
| Plasticizer | 5% Triacetin | 5% Triacetin | 5% Triacetin | | |
| Stabilizer (alkyd resin) | Jägalyd WE 57 | Jägalyd WE 57 | Jägalyd WE 57 | Jägalyd WE 57 | Jägalyd WE 57 |
| Application | Separate | Separate | Separate | Separate | Together |
| Concentration applied in % by weight | 10 | 10 | 10 | 10 | 10 |
| Ratio (PVAc/stabil.) | 1:1 | 0.2:0.8 | 0.8:0.2 | 1:1 | 1:1 |
| Layer thickness of sand | 2–3 cm | 2–3 cm | 2–3 cm | 2–3 cm | 2–3 cm |
| Strength after drying | F++ | F+ | F− | F++ | F++ |
| Thickness of the solidified layer | 2.0–2.5 cm | 1.8–2.0 cm | 0.5–0.7 cm | 2.0 cm | 2.0 cm |
| 1st Watering | | | | | |
| Appearance in the moist state | F++ | F+ | F+ | F++ | F++ |
| Appearance after drying for 24 h | F++ | F++ | F+ | F++ | F++ |
| Appearance after artificial watering for one week Evaluation in the moist state | F++ | F++ | F−− | F++ | F++ |

In another series of tests, trays comparable to those described above were not artificially watered in the laboratory, but instead were left outdoors at applicants' headquarters for the months of March and April, 1994 and then evaluated.

The results of this evaluation are set out in Table 2 below.

TABLE 2

| Impregnating agent | PVAc | PVAc | PVAc |
|---|---|---|---|
| Plasticizer | 5% Triacetin | 5% Triacetin | 5% Triacetin |
| Stabilizer (alkyd resin) | Jägalyd WE 57 | Jägalyd WE 57 | Jägalyd WE 57 |
| Application | Separate | Separate | Separate |
| Concentration applied in % by weight | 5 | 10 | 30 |
| Ratio | 1:1 | 1:1 | 1:1 |
| Layer thickness of sand | 2–3 cm | 2–3 cm | 2–3 cm |
| Strength after drying | F++ | F++ | F+ |
| Thickness of the solidified layer | 2.0–2.5 cm | 2.1–2.5 cm | 0.3–0.6 cm |
| Storage outdoors for 1 day | | | |
| Appearance in the moist state | — | F++ | — |
| Appearance after 1 week outdoors with rain | F++ | F++ | F-- |
| Appearance after 1 month outdoors with rain | F++ | F++ | F-- |
| Appearance after 2 months outdoors with rain | | F++ | |

Comparison of the last column of Table 2 with the preceding columns shows that, where the surface penetration of the impregnating compositions is inadequate, unsatisfactory stabilization is obtained. In the case illustrated, penetration of the impregnating composition and the associated stabilizer was inadequate because of their excessive concentration in the aqueous treatment formulations.

To evaluate the effect of different quantities and concentrations applied, the tests described above were repeated in trays with a sand layer thickness of around 10 cm. The results are set out in Table 3 below.

TABLE 3

| Impregnating agent | PVAc | PVAc | PVAc |
|---|---|---|---|
| Plasticizer | 5% Triacetin | 5% Triacetin | 5% Triacetin |
| Stabilizer (alkyd resin) | Jägalyd WE 57 | Jägalyd WE 57 | Jägalyd WE 57 |
| Application | Together | Together | Together |
| Concentration applied in % by weight | 5 | 10 | 30 |
| Ratio | 1:1 | 1:1 | 1:1 |
| Layer thickness of sand | 10 cm | 10 cm | 11 cm |
| Strength after drying | F++ | F++ | F+ |
| Thickness of the solidified layer | 2.0–2.1 cm | 2.1–2.4 cm | 0.8–1.0 cm |
| Storage outdoors for 1 day | | | |
| Appearance in the moist state | F++ | F++ | F- |

Example 2

The results of the laboratory tests of Example 1 were investigated in further tests.

An earth wall with an inclination of approximately 45° and a height of 5 m is coated in accordance with the invention in 2 m wide segments with the aqueous stabilizing dispersions. To this end, the liquid is introduced into a pressure vessel and sprayed through a flat nozzle under a container pressure of around 8 bar. Application lasted about 3 to 5 minutes.

At the time of application, the earth wall was slightly moist (rain on the previous day). The weather was dry during application and on the following day. To test plant growth, both the segments to be treated and the area around these segments were sown with natural meadow seeds.

Seven test fields were treated and evaluated in accordance with the following particulars under "test numbers 1 to 7". The test details were as follows.

Test number: 1

| | |
|---|---|
| Stabilizing material | PVAc |
| Method of application | Spraying |
| Form as supplied | 57.5% by wt.* |
| Application form | 10% by wt. |
| Dilution of the form as supplied with water in a ratio of | 1:5.75 |
| Area coated | 10 m$^2$ |
| Quantity of application form used | 20 l |
| Density of coating with solid | 200 g/m$^2$ |
| Aftertreatment | None |
| Results immediately after application | Flexible, coherent |

Test number: 2

| | | |
|---|---|---|
| Stabilizing material | PVAc | Alkyd resin |
| Method of application | Spraying, separate | Spraying after waiting for 3 h |
| Form as supplied | 57.5% by wt. | 65% by wt. |
| Application form | 10% by wt. | 10% by wt. |
| Dilution of the form as supplied with water in a ratio of | 1:5.75 | 1:6.5 |
| Area coated | 10 m$^2$ | 10 m$^2$ |
| Quantity of application form used | 20 l | 20 l |
| Density of coating with solid | 200 g/m$^2$ | 200 g/m$^2$ |
| Aftertreatment | None | None |
| Results immediately after application | Flexible, coherent | Flexible, coherent |

Test Number: 3

| | | |
|---|---|---|
| Stabilizing material | PVAc | Alkyd resin |
| Method of application | mixture sprayed | |
| Form as supplied | 57.5% by wt. | 65% by wt. |
| Application form | 10% by wt. | 10% by wt. |
| Dilution of the form as supplied with water in a ratio of | 1:2.9 | 1:3.3 |
| Area coated | 10 m$^2$ | 10 m$^2$ |
| Quantity of application form used | 20 l | 20 l |
| Density of coating with solid | 200 g/m$^2$ | 200 g/m$^2$ |
| Aftertreatment | None | None |
| Results immediately after application | Flexible, coherent | Flexible, coherent |

Test number: 4

| | | |
|---|---|---|
| Stabilizing material | PVAc | Alkyd resin |
| Method of application | Mixture sprayed | |
| Form as supplied | 57.5% by wt. | 65% by wt. |
| Application form | 10% by wt. | 10% by wt. |
| Dilution of the form as supplied with water in a ratio of | 1:2.9 | 1:3.3 |
| Area coated | 10 m$^2$ | 10 m$^2$ |
| Quantity of application form used | 20 l | 20 l |
| Density of coating with solid | 200 g/m$^2$ | 200 g/m$^2$ |
| Aftertreatment | Watered after 3 h with 2 l/m$^2$ | |
| Results immediately after application | Soft, flexible, coherent | |

Test number: 5

| | |
|---|---|
| Stabilizing material | Commercial product based oligobutadiene |
| Method of application | Spraying |
| Form as supplied | 35% by wt. |
| Application form | 3.5% by wt. |
| Dilution of the form as supplied with water in a ratio of | 1:10 |
| Area coated | 10 m$^2$ |
| Quantity of application form used | 10 l |
| Density of coating with solid | 35 g/m$^2$ |
| Aftertreatment | None |
| Results immediately after application | No Cohesion |

Test number: 6

| | |
|---|---|
| Stabilizing material | PVAc |
| Method of application | By watering can |
| Form as supplied | 57.5% by wt. |
| Application form | 10% by wt. |
| Dilution of the form as supplied with water in a ratio of | 1:5.75 |
| Area coated | 10 m$^2$ |
| Quantity of application form used | 20 l |
| Density of coating with solid | 200 g/m$^2$ |
| Aftertreatment | None |
| Results immediately after application | Soft, flexible, coherent |

Test number: 7

| | | |
|---|---|---|
| Stabilizing material | PVAc | Alkyd resin |
| Method of application | Mixture sprayed | |
| Form as supplied | 57.5% by wt. | 65% by wt. |
| Application form | 10% by wt. | 10% by wt. |
| Dilution of the form as supplied with water in a ratio of | 1:2.9 | 1:3.3 |
| Area coated | 10 m$^2$ | 10 m$^2$ |
| Quantity of application form used | 10 l | 10 l |
| Density of coating with solid | 100 g/m$^2$ | 100 g/m$^2$ |
| Aftertreatment | None | |
| Results immediately after application | Flexible, coherent | |

*% by wt. = % by weight

All the test fields except for field 5 showed distinct stabilization of the soil surface 3 hours after application. In field 5 (oligobutadiene-based treatment preparation), no significant soil stabilization was discernible.

In further tests, the test fields thus treated and the adjoining areas were regularly observed and artificially watered in view of the hot and dry weather conditions. The particulars were as follows:

Weather since the beginning of the test in the middle June, 1994: hot and dry. No visible cracking through drying out of the test fields.

10 Days after application, each field is watered by pump for 5 minutes at an outside temperature of 28° C. 24.6 Liters of water per M 2 were sprayed on under a pump pressure of around 25 bar.

The evaluation of test fields 1 to 7 was as follows:

Field 1:

Water absorption very good, serious sliding in the upper quarter after watering

Field 2:
Water absorption very good, strength remained intact, no cracks, no sliding
Field 3:
Water absorption very good, strength remained intact, no cracks, no sliding
Field 4:
Water absorption very good, cracks formed after watering for 3 minutes, risk of sliding
Field 5:
Water absorption only moderate, drained off the surface, cracks formed after only brief watering, flooding, watering terminated after 3 mins.
Field 6:
Water absorption very good, strength remained intact, no cracks, no sliding
Field 7:
Water absorption very good, strength remained intact, no cracks, no sliding 4.5 Hours after watering, the condition of the test fields is re-inspected and evaluated. The results were as follows:
Field 1:
Surface only a thin crust, cracked
Field 2:
Surface thin crust, condition good, slightly cracked
Field 3:
As field 2
Field 4:
Surface slightly more stable, no further cracks or sliding since watering Field 5:
Hardly anything to be seen or felt of the surface treatment
Field 6:
Surface hard, but not cracked, condition very good
Field 7:
As field 6

Despite the intense heat, none of the test fields had dried out, but instead still had a good moisture level. The untreated areas adjacent the test fields had become very dry over the same period. The previously sown grass seeds had not been washed away from any of the treated test fields.

3 Weeks after the beginning of the test (several heavy showers of rain had fallen on the test fields over this period), the grass seeds had germinated and plant growth appeared to be unimpeded by comparison with the untreated, adjacent seeded areas.

Example 3

Further tests with PVAc as impregnating agent, but with other stabilizers were carried out in accordance with the teaching of the invention by the same method as in Example 1. The formulations used and the results obtained are set out in Table 4 below.

The commercial stabilizer "JÄGALYD WE 156" (a product of E. JÄGER, Düsseldorf) was used as stabilizer. This product is a water-emulsified, drying and pollutant-free binder based on natural/synthetic materials which may be used, for example, for water-dilutable wood protection varnishes. In the other two tests of Table 4, linseed oil was used as the stabilizer according to the invention. In one test, the linseed oil was used in the form of a 10% aqueous emulsion (APG as emulsifier) and, in the other test, was applied as such to the sand surface to be stabilized.

In all the tests, the impregnating agent was an aqueous PVAC dispersion containing 5% by weight of triacetin which was applied to the sand surfaces to be stabilized separately from the stabilizer according to the invention in a first process step.

Particulars of the formulations used and the test results obtained after artificial watering are set out in Table 4 below. The evaluation of the strength values (F) corresponds to the symbols identified in Example 1.

TABLE 3

| Impregnating agent | PVAc | PVAc | PVAc |
|---|---|---|---|
| Plasticizer | 5% Triacetin | 5% Triacetin | 5% Triacetin |
| Coverage of solids 1 | 7.7 g/380 cm$^2$ | 7.7 g/380 cm$^2$ | 7.7 g/380 cm$^2$ |
| Concentration applied | 10% | 10% | 10% |
| Stabilizer | Jägalyd WE 156 | Linseed oil | Linseed oil |
| Coverage of solids 2 | 7.7 g/380 cm$^2$ | 7.7 g/380 cm$^2$ | 7.7 g/380 cm$^2$ |
| Concentration applied + | 10% | 10% | — |
| APG for emulsification | — | 1.50% | — |
| Layer thickness of sand or soil | 3 cm | 3 cm | 3 cm |
| Application | Separate | Separate | Separate |
| Strength after drying | F+ | F+ | F+ |
| Thickness of the solidified layer | 1.8 cm | 1.0 cm | 1.4 cm |
| First artificial watering | 1.5 l/m$^2$ | 1.5 l/m$^2$ | 1.5 l/m$^2$ |
| Strength | F+ | F− | F+ |
| Second artificial watering | 3.0 l/m$^2$ | 3.0 l/m$^2$ | 3.0 l/m$^2$ |
| Strength | F+ | F− | F+ |
| Third artificial watering | 1.5 l/m$^2$ | 1.5 l/m$^2$ | 1.5 l/m$^2$ |
| Strength | F++ | F++ | F++ |
| Precipitation on 6th day | 12 l/m$^2$ | 12 l/m$^2$ | 12 l/m$^2$ |
| 1 week Strength | F+ | F+ | F+ |

What is claimed is:

1. The process of increasing the water resistance of soil impregnated with esters of polyvinyl alcohol and monocarboxylic acids selected from the group consisting of $C_1$–$C_5$ monocarboxylic acids and $C_8$–$C_{16}$, monocarboxylic acids and mixtures thereof comprising adding to said soil a stabilizer selected from the group consisting of mono- or polyolefinically unsaturated fatty acids, fatty alcohols, and water- insoluble esters, ethers and salts thereof.

2. A process as in claim 1 wherein said fatty acids and fatty alcohols contain 6 to 30 carbon atoms.

3. A process as in claim 1 including adding to said soil impregnated with said esters of polyvinyl alcohol a plasticizer selected from the group consisting of triesters of glycerol and lower aliphatic $C_{2-4}$, monocarboxylic acids, citric acid triesters and aliphatic $C_2$–$C_6$ monohydric alcohols, and epoxidized triglycerides of at least partly olefinically unsaturated fatty acids.

4. A process as in claim 1 wherein said unsaturated fatty acids are present as calcium or aluminum salts thereof.

5. A process as in claim 1 wherein said stabilizer is applied to said soil in admixture with said esters of polyvinyl alcohol.

6. A process as in claim 1 wherein said stabilizer is applied to said soil in the form of an aqueous dispersion or emulsion.

7. A process as in claim 1 wherein said stabilizer is a solid at a temperature of 5° C. to 15° C. and is applied to said soil in the presence of an organic flow aid.

8. A process as in claim 7 wherein said flow aid is selected from the group consisting of alcohols, ethers and carboxylic acid esters which flow at a temperature of 5° C. to 15° C.

9. A process as in claim 1 wherein stabilizer consisting of said esters is an ester of at least partly olefinically unsaturated fatty acids and alcohols containing 2 to 6 hydroxyl groups and up to 6 carbon atoms.

10. A process as in claim 1 wherein said stabilizer is selected from the group consisting of a polyester of an alkyd resin, a polyvinyl alcohol oligomer and polymer esterified with fatty acid residues and (meth)acrylate oligomers esterified with optionally olefinically unsaturated fatty alcohol residues.

11. A process as in claim 1 wherein said stabilizer is derived from natural materials.

12. A process as in claim 1 wherein said esters of polyvinyl alcohol are selected from the group consisting of polyvinyl acetate, polyvinyl propionate, and copolymers thereof with vinyl esters of $C_8$–$C_{16}$ fatty acids.

13. A process as in claim 1 wherein said esters of polyvinyl alcohol and said stabilizer are present in a weight ratio of 5:1 to 1:5 on a solids basis.

14. A process as in claim 1 including adding to said stabilizer a film-forming agent having a minimum film-forming temperature of from 0° C. to 15° C.

15. A process as in claim 1 wherein said esters of polyvinyl alcohol and said stabilizer are applied to said soil in a quantity of about 50 g/m$^2$ to about 250 g/m$^2$ of soil area.

16. A process as in claim 1 including adding plant seeds to said soil.

* * * * *